S. COXON.
Signal-Lantern.
No. 206,933.   Patented Aug. 13, 1878.
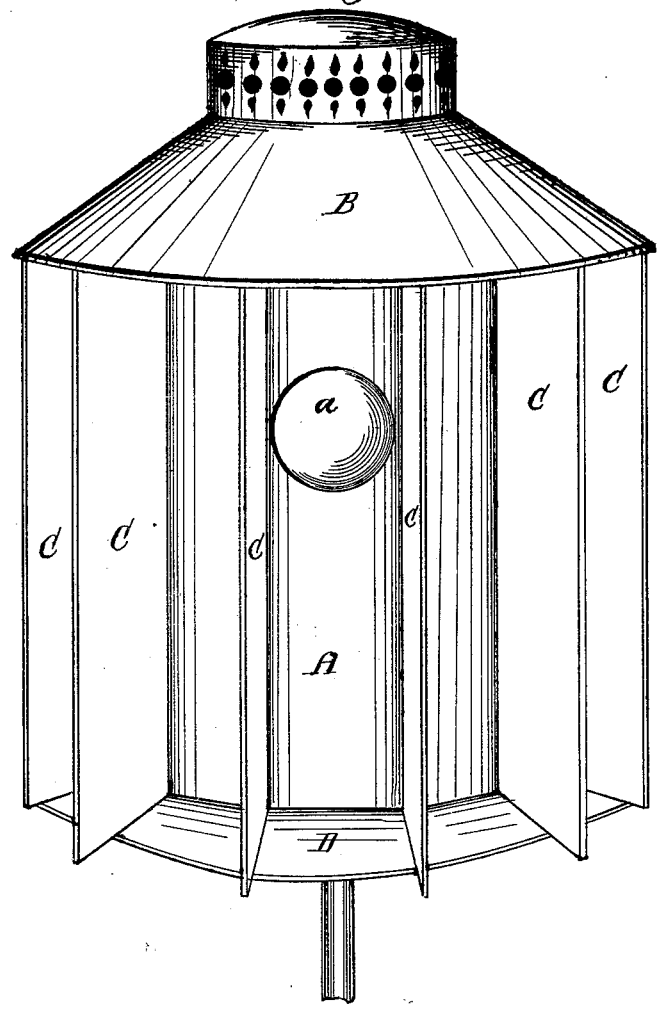
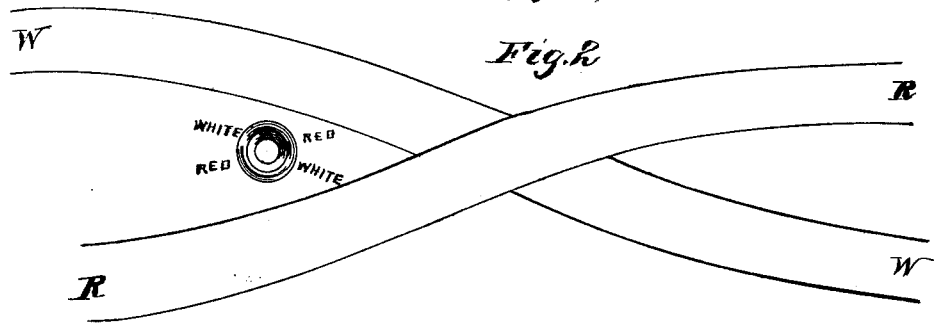
WITNESSES
A. Scott
H. B. Groff
INVENTOR,
Samuel Coxon,
per C. H. Fowler,
Attorney.

UNITED STATES PATENT OFFICE.

SAMUEL COXON, OF TORONTO, ONTARIO, CANADA.

IMPROVEMENT IN SIGNAL-LANTERNS.

Specification forming part of Letters Patent No. 206,933, dated August 13, 1878; application filed April 4, 1877.

*To all whom it may concern:*

Be it known that I, SAMUEL COXON, of the city of Toronto, in the county of York, in the Province of Ontario, Canada, have invented certain new and useful Improvements in Signal-Lamps; and I do hereby declare that the following is a full, clear, and exact description of the same, reference being had to the accompanying drawings, forming a part of this specification, in which—

Figure 1 is a perspective view. Fig. 2 is a view illustrating the position of the lamp at a point where two tracks cross each other.

This invention has relation to that class of signal-lamps provided with two or more lights of different colors, and which are adapted to be used as railway-signals as well as for steamboats, piers, and many other places or situations in which it may be found of value.

The invention has for its object to so construct the lamp in its several parts as to render it more serviceable in stormy weather, and less liable to damage, the parts being so braced and connected together as to increase its strength and durability; and also the peculiar construction of the shades or blinds, preventing the falling snow from obstructing the rays of light through the glasses.

In the accompanying drawings, A represents the body of the lamp, which may be hexagonal, octagonal, or of other suitable shape, with two or more lights, *a*, arranged as desired around its circumference. A lighted lamp is placed within the body A through a suitable door, the rays proceeding from the lamp escaping through the glasses *a*. These glasses are necessarily so close together that if they were not protected by some convenient means a confusion of the rays of light from the different glasses would be the consequence, and it would therefore be impossible to distinguish one light from another.

Previous to my invention it was generally the custom to place around the glasses annular flanges of sufficient width, or projecting out a sufficient distance from the glasses to prevent the rays of light from one glass from interfering with those of another, so that the light from one track is visible only from the track it is intended to signal.

The objection to these annular bands or flanges around the light was the great danger of their becoming filled with the falling snow, particularly when the wind is blowing in a direction toward the light. To avoid this is one of the principal objects of my invention, and which will be now set forth.

The body A has secured around its top a slanting hood or roof, B, to prevent the snow from settling thereon. Rigidly secured to the body A are blinds C, the upper ends thereof being secured to the under side of the hood or roof B, and the lower ends to a projecting and circumferential plate, D, secured to the bottom of the body A. This plate may be slightly inclined in a downward direction from the body A, to prevent the snow or water from lodging thereon, and it is also much narrower than the blinds C. It will be understood, from the fact that these blinds extend vertically the entire length or nearly the entire length of the body A, that space is left from the plate D to the lower part of the glass of sufficient length or depth to allow for the drifting or lodgment of snow without reaching on a line with the lights or glasses *a*, which would obstruct the rays of light and create confusion, as previously stated.

In further describing the use of my improved signal-lamp, by reference to Fig. 2 of the drawing, it will be seen that the lamp is shown as in a suitable position for signaling two tracks crossing. Assuming that a red light is a signal to "stop" and a white light to "go ahead," and that the track marked W is "clear," the lamp would be set to show a white light on W W, and a red light on the tracks marked R R. In a position of this kind it is quite evident that without the shades or blinds C the rays of light from the glasses adjacent to each other would cause confusion, and if said glasses or rays of light were obstructed by the lodgment of the snow during a wind and snow storm, (which would be the case with the annular band or flange surrounding the glasses,) it would result in equal confusion as though no band or flange was used.

The necessity, therefore, of a perfectly-constructed signal-lamp will be at once apparent, and the value of my invention readily appreciated.

The vertical blinds C are not alone valuable for preventing the snow from obstructing the rays of light; but the hood or roof B, plate D, in connection with the blinds, form a net-work or brace around the body of the lamp which renders it exceedingly strong and durable, and less liable to become injured by a storm or rough handling.

No peculiar mechanism is required to operate my lamp, as it simply takes the place of the ordinary lamp on top of a semaphore post.

Having now fully described my invention, what I claim as new, and desire to secure by Letters Patent, is—

1. A signal-lamp consisting of the body A, provided with two or more independent lights or glasses, $a$, located above the lower part of said body, in combination with the vertical blinds C, arranged between and upon each side of the lights or glasses and extending the entire length, or nearly the entire length, of the body A, substantially as and for the purpose set forth.

2. The body A of a signal-lamp, provided with two or more lights or glasses, $a$, in combination with the hood or roof B, plate D, and vertical blinds C, secured to said hood or roof and plate, substantially as and for the purpose specified.

3. The body A, with lights or glasses $a$, inclined or slanting hood or roof B, vertical blinds C, and plate D, said plate being formed narrower than the blinds and slightly inclined downward from the body, substantially as and for the purposes set forth.

SAMUEL COXON.

Witnesses:
GEO. A. AIRD,
DONALD C. RIDOUT.